Oct. 16, 1945.   G. A. TINNERMAN   2,386,824
FASTENING DEVICE
Filed March 20, 1944

INVENTOR.
GEORGE A. TINNERMAN
BY Bates, Teare, & McDean
ATTORNEYS

Patented Oct. 16, 1945

2,386,824

UNITED STATES PATENT OFFICE 2,386,824

FASTENING DEVICE

George A. Tinnerman, Cleveland, Ohio, assignor to Tinnerman Products, Inc., Cleveland, Ohio, a corporation of Ohio Application March 20, 1944, Serial No. 527,274

6 Claims. (Cl. 85—32)

This invention relates to fastening devices and more particularly to those which are adapted for use in making a threaded connection with a stud that is adapted to be extended into a pocket in a molded non-metallic member.

It is frequently desirable to attach an article that is made of molded, non-metallic plastic material, such as thermo-setting resinous material, to another article by means of a stud member having a threaded shank, such as a bolt, screw, or the like, but due to the frangible nature of the moldable material, the article has lacked sufficient mechanical strength to permit the use of threads on the material for direct engagement with the threads on the inserted stud.

An object of the present invention, therefore, is to make a simple and inexpensive insert which may be embedded in the moldable material, and which may have thread engaging portions thereon projecting into a pocket into which the threaded stud is adapted to be received. The insert may thus be applied during the molding operation, and the thread engaging portions thereon will be automatically positioned in correct relationship to each other, so as to facilitate attachment to the threaded stud, merely by the normal operation of turning the stud in the socket. The invention also contemplates a method of molding the insert into operative position within the article.

Figure 2:
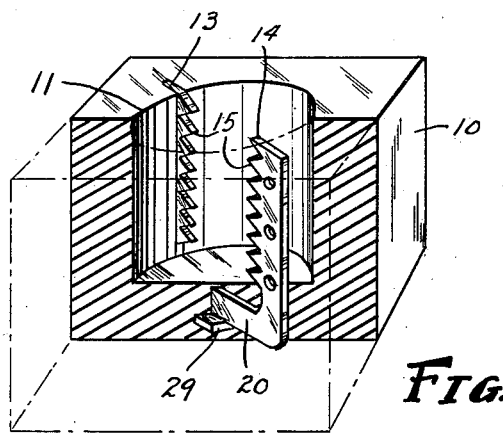
Figure 1:
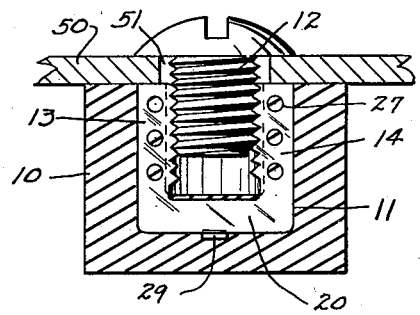
Figure 3:
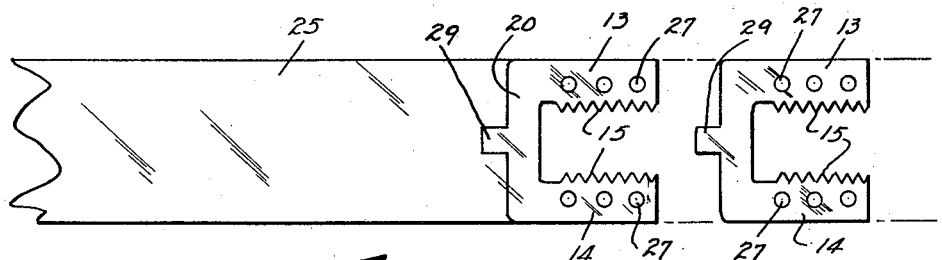
Figure 4:
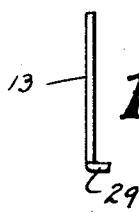
Figure 5:
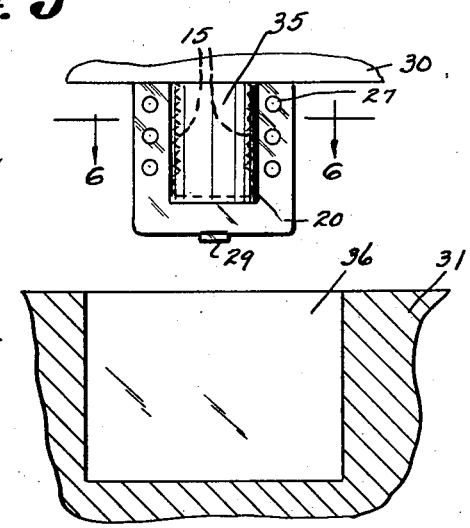
Figure 6:
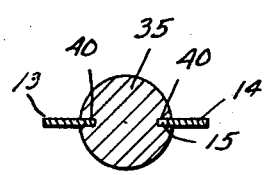

Referring now to the drawing, Fig. 1 is a vertical section taken through an article embodying my invention; Fig. 2 is a sectional view, partly broken away, to show the interior construction; Fig. 3 is a top plan view of the blank illustrating one way in which the threaded insert may be made; Fig. 4 is an end view of the insert at the completion of the forming operation; Fig. 5 is an exploded view, partly in elevation, and partly in section, showing a step in the method of molding the insert into place, and Fig. 6 is a section taken on a plane indicated by the line 6—6 in Fig. 5.

Referring now to Figs. 1 and 2, 10 indicates a body of moldable material, such as that having a resinous base, and 11 indicates a socket therein which is adapted to receive the threaded shank of a stud 12. My invention contemplates the utilization of spaced strips 13 and 14 which are adapted to be embedded in the body 10, but to have a portion thereof projecting into the pocket and to be provided with thread engaging teeth 15 on each such exposed portion.

The strips 13 and 14 preferably comprise the arms of a one-piece, U-shaped strip which has a connecting portion 20 that lies in the same plane as the arms 13 and 14, and that is embedded in the moldable material adjacent the bottom of the pocket. The U-shaped formation enables the strip to be stamped out of a rectangular strip 25, as is shown in Fig. 3, wherein the side edges of the strip become the outer edges of the arms 13 and 14. During such formation the arms may be apertured, as at 27, for the reception of the moldable material, thereby effecting a secure anchorage of the member in the body of the material. Additionally, the connecting portions may have a tab 29 formed thereon, and after removal of the strip from the blank, the tab may be turned at a right angle to the plane of the body, as is shown in Fig. 4, so as to make a laterally extending portion that resists axial movement of the member out of the material after the molding operation is completed.

One method of embedding the insert into the body of the material is to utilize two mold sections 30 and 31, as shown in Fig. 5, which are adapted to be carried by the heads of a press in any well known manner. The mold section 30 has a core 35 extending downwardly therefrom, and such core is shown in the form of a cylinder, the diameter of which is equal to the diameter of the pocket 11 to be formed in the molded article. Additionally, the lower end of the core terminates short of the cavity 36 in the mold section 31 by an amount sufficient to enable the connecting part 20 of the insert to clear the bottom of the cavity. The insert is adapted to be positioned on the core and to be held thereagainst solely by frictional engagement therewith, preferably by means of slots 40 in the outer longitudinally extending portions of the core, as appears in Fig. 6, and the depth of such slots is sufficient only to accommodate the teeth on the arms of the insert. Accordingly, an insert may be slid axially of the core while the mold sections are separated, as shown in Fig. 5, and then the mold sections may be brought together and the intervening space may be filled with the material of which the article is to be made. During such molding operation the arms and connecting portion of the insert are firmly embedded in the material and after the material is set, the mold sections are separated, whereupon, the core is drawn out of engagement with the insert and there is thus formed the pocket 11 with only the teeth on the insert projecting into the cavity of the pocket.

After formation of the completed article in the mold, it may be used as is shown in Fig. 1 for attachment to a supporting surface 50 by means of the connecting stud 12, which extends through an opening 51 in a part 50, and enters the pocket 11 in threaded engagement with the teeth 15. This enables the stud to be drawn as tightly as necessary without danger of stripping the threads, or without the likelihood of the insert being stripped from the body of the moldable material. The invention, therefore, provides a simple and inexpensive way of attaining a secure engagement with a threaded stud in a moldable article.

I claim:

1. In combination, a body of moldable material having a pocket opening onto one face thereof for receiving the shank of a threaded stud, and spaced strips embedded in said body adjacent the pocket, each strip having a portion thereof extending into the pocket and provided with teeth for the reception of the threaded fastener.

2. In combination, a body of moldable material having a pocket opening onto one face thereof receiving the shank of a U-shaped insert embedded in the body, and having teeth on the inside portions of the arms of the U, said teeth projecting into the pocket for engagement with a threaded stud.

3. In combination, a body of moldable material having a pocket therein for receiving the shank of a stud, and a stud engaging member extending down the sides crosswise of the bottom of the pocket and embedded in the material but having portions thereof projecting into the pocket for engagement with the stud.

4. In combination, a body of moldable material having a pocket opening onto one surface thereof for the reception of a stud fastening member, and a U-shaped strip embedded in the material and extending down the sides and crosswise of the bottom of the socket, said strip being entirely sealed within the material except for opposed portions extending lengthwise of the pocket, said exposed portions being provided with teeth for engagement with a thread on the stud that is adapted to be inserted into said pocket.

5. A fastening device comprising a one-piece, U-shaped strip having the arms and connecting portion of the U lying in the same plane, the arms being provided with teeth on the inner edges thereof and having apertures therein intermediate the inner and outer edges of the arms, and the connecting portion having a tab extending laterally thereof.

6. A fastening device comprising a U-shaped strip having co-planar arms and a connecting portion, the arms having thread engaging teeth on the inner edges thereof, and the connecting portion having a tab extending normal to the plane of the connecting portion.

GEORGE A. TINNERMAN.